US012525201B2

(12) United States Patent
Shen

(10) Patent No.: US 12,525,201 B2
(45) Date of Patent: Jan. 13, 2026

(54) ELECTRONIC PAPER DEVICE, CONTROLLING METHOD THEREOF, AND NON-TRANSITORY COMPUTER-READABLE STORAGE MEDIUM

(71) Applicant: E Ink Holdings Inc., Hsinchu (TW)

(72) Inventor: Yi Jhou Shen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 18/669,543

(22) Filed: May 21, 2024

(65) Prior Publication Data

US 2025/0029570 A1 Jan. 23, 2025

(30) Foreign Application Priority Data

Jul. 21, 2023 (TW) ................................ 112127430

(51) Int. Cl.
*G09G 3/34* (2006.01)

(52) U.S. Cl.
CPC ....... *G09G 3/344* (2013.01); *G09G 2330/022* (2013.01); *G09G 2360/12* (2013.01); *G09G 2370/16* (2013.01)

(58) Field of Classification Search
None
See application file for complete search history.

(56) References Cited

U.S. PATENT DOCUMENTS 8,766,919 B1 * 7/2014 Lachwani ............ G06F 1/3265 345/169
9,997,064 B2 6/2018 Yang et al.
10,459,511 B2 * 10/2019 Lee .................... H04N 21/4436
10,912,131 B2 2/2021 Lee et al.
11,089,273 B2 8/2021 Tomono et al.
2010/0106588 A1 * 4/2010 Jones ................. G06Q 30/0223 709/248
2012/0280952 A1 * 11/2012 Hsu ........................ G09G 3/344 345/204
2016/0189638 A1 * 6/2016 de Greef ............... G09G 3/348 345/61

FOREIGN PATENT DOCUMENTS

CN 101159128 A 4/2008
TW 201337876 A 9/2013

OTHER PUBLICATIONS

The office action of corresponding TW application No. 112127430 issued on May 3, 2024.

* cited by examiner

*Primary Examiner* — Matthew Yeung
(74) *Attorney, Agent, or Firm* — CKC & Partners Co., LLC

(57) ABSTRACT

This disclosure provides an electronic paper device which includes an electronic paper display, an application circuit, and a microprocessor. The microprocessor establishes a communication connection with an external device to continuously receive image data, and stores the image data in a buffer memory of the microprocessor. This image data is a portion of a frame. When the communication connection enters an idle state, the microprocessor writes the image data into the electronic paper display through the application circuit without initiating a refresh process of the electronic paper display.

12 Claims, 4 Drawing Sheets

ELECTRONIC PAPER DEVICE, CONTROLLING METHOD THEREOF, AND NON-TRANSITORY COMPUTER-READABLE STORAGE MEDIUM

RELATED APPLICATIONS

This application claims priority to Taiwan Application Serial Number 112127430 filed Jul. 21, 2023, which is herein incorporated by reference.

BACKGROUND

Field of Invention

The present disclosure relates to a controlling method for an electric paper device while the electric paper device is communicatively connecting to an external device for receiving image date.

Description of Related Art

When an electric paper display is configured to render a lossless image, such a file is larger than a distorted image, thereby requiring larger memory. With the advancement of wireless transmission technology, data transmission speeds are also increasing, resulting in that the control circuitry of the electric paper display has to process the received data rapidly. The aforementioned factors can lead to several issues. For instance, if the memory is too small, it may be incapable of storing the lossless image. In high-speed transmissions, there might be fewer system resources available, and the system might lack enough time to control the electric paper display. Additionally, to conserve power during some wireless transmissions, the system may enter a sleep state in which the electric paper display cannot be controlled. Addressing these challenges is a concern for professionals in this field.

SUMMARY

Embodiments of the present disclosure provide an electric paper device including an electric paper display, an application circuit, and a microprocessor. The application circuit is electrically connected to the electric paper display. The microprocessor has a buffer memory and is electrically connected to the application circuit. The microprocessor is configured to establish a communication connection with an external device for continuously receive image data and store the image data into the buffer memory. The image data belongs to a portion of a frame. When the communication connection enters an idle state, the microprocessor is configured to write the image data into the electric paper display through the application circuit without initiating a refresh process of the electric paper display.

In some embodiments, when the communication connection is established, the microprocessor is configured to power on the electric paper display and perform an initialization process corresponding to the electric paper display.

In some embodiments, when the communication connection is terminated, the microprocessor is configured to sequentially perform multiple steps: switching on a panel power of the electric paper display; controlling the electric paper display to perform the refresh process; switching off the panel power of the electric paper display; and powering off the electric paper display.

In some embodiments, before the microprocessor enters a sleep state, the microprocessor is configured to determine if the electric paper display completes a display process. If the electric paper display does not yet complete the display process, the microprocessor enters the sleep state after the application circuit completes the display process.

In some embodiments, the communication connection complies with standard of Bluetooth®.

From another aspect, embodiments of the present disclosure provide a controlling method for the electric paper device. The controlling method including: establishing, by the microprocessor, a communication connection with an external device for continuously receive image data; storing the image data into a buffer memory of the microprocessor, in which the image data belongs to a portion of a frame; and when the communication connection enters an idle state, writing, by the microprocessor, the image data into the electric paper display through the application circuit without initiating a refresh process of the electric paper display.

In some embodiments, the controlling method further includes: when the communication connection is established, powering on the electric paper display and performing an initialization process corresponding to the electric paper display.

In some embodiments, the controlling method further includes: when the communication connection is terminated, sequentially performing multiple steps. The steps includes: switching on a panel power of the electric paper display; controlling the electric paper display to perform the refresh process; switching off the panel power of the electric paper display; and powering off the electric paper display.

In some embodiments, the controlling method further includes: before the microprocessor enters a sleep state, determining if the electric paper display completes a display process; and if the electric paper display does not complete the display process yet, entering, by the microprocessor, the sleep state after the application circuit completes the display process.

In some embodiments, the communication connection complies with standard of Bluetooth®.

From another aspect, embodiments of the present disclosure provide a non-transitory computer readable storage medium storing multiple instructions which are configured to perform multiple steps: establishing, by a microprocessor, a communication connection with an external device for continuously receive image data; storing the image data into a buffer memory of the microprocessor, wherein the image data belongs to a portion of a frame; and when the communication connection enters an idle state, writing, by the microprocessor, the image data into an electric paper display through an application circuit without initiating a refresh process of the electric paper display.

In some embodiments, the steps further include: when the communication connection is established, powering on the electric paper display and performing an initialization process corresponding to the electric paper display.

In some embodiments, the steps further include: when the communication connection is terminated, sequentially performing: switching on a panel power of the electric paper display; controlling the electric paper display to perform the refresh process; switching off the panel power of the electric paper display; and powering off the electric paper display.

In some embodiments, the steps further include: before the microprocessor enters a sleep state, determining if the electric paper display completes a display process; and if the electric paper display does not complete the display process yet, entering, by the microprocessor, the sleep state after the application circuit completes the display process.

In some embodiments, the communication connection complies with standard of Bluetooth®.

In the above-mentioned electronic paper device and controlling method, image display is realized under high-speed transmission.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
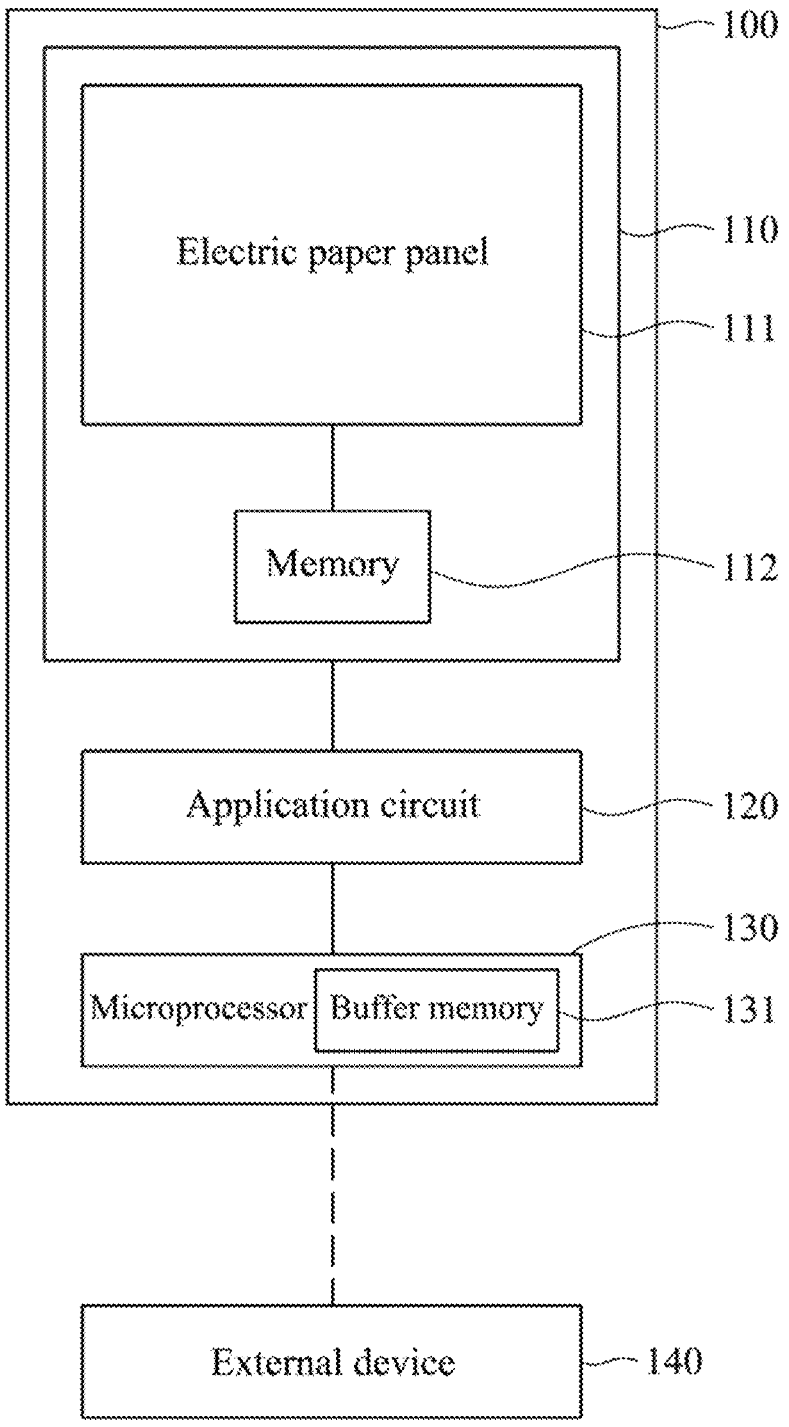
FIG. 1 is a schematic illustration of an electric paper device according to one embodiment.

FIG. 1 is a schematic illustration of an electric paper device according to one embodiment. Referring to FIG. 1, the electric paper device 100 includes an electric paper display 110, an application circuit 120, and a microprocessor 130. The application circuit 120 is electrically connected to both the electric paper display 110 and the microprocessor 130.

The electric paper display 110 includes an electric paper panel 111 and a memory 112 which is electrically connected to the electric paper panel 111. The memory 112, for instance, is a random-access memory (RAM). The electric paper panel 111 includes components such as microcapsules, substrates, thin-film transistors, electrodes, data lines, and gate lines. The aforementioned microcapsules, also known as electronic ink, can display electronic content on a plastic film. Each microcapsule contains a clear solution not only with positively charged white particles and negatively charged black particles but also can include particles of other colors, such as differently charged colored particles, to achieve color displays. When an appropriate electric field is applied, the corresponding particles will move to their respective positions within the microcapsule, resulting in the display panel showing colored content.

The application circuit 120, for instance, is an electronic paper application reference circuit, designed to control and drive the electric paper display 110. The microprocessor 130 provides communication capabilities and includes a buffer memory 131. This buffer memory 131 is, for example, a random-access memory (RAM). The microprocessor 130 establishes a communication connection with an external device 140. In this embodiment, the communication connection complies with the standard of Bluetooth®. However, in other embodiments, the communication connection can also comply with standards of cellular networks (also known as mobile networks), near-field communication (NFC), infrared communication, Wi-Fi, and other standards; the disclosure is not limited to this. The external device 140 can be a smartphone, tablet, laptop, or any electronic device.

Figure 2:
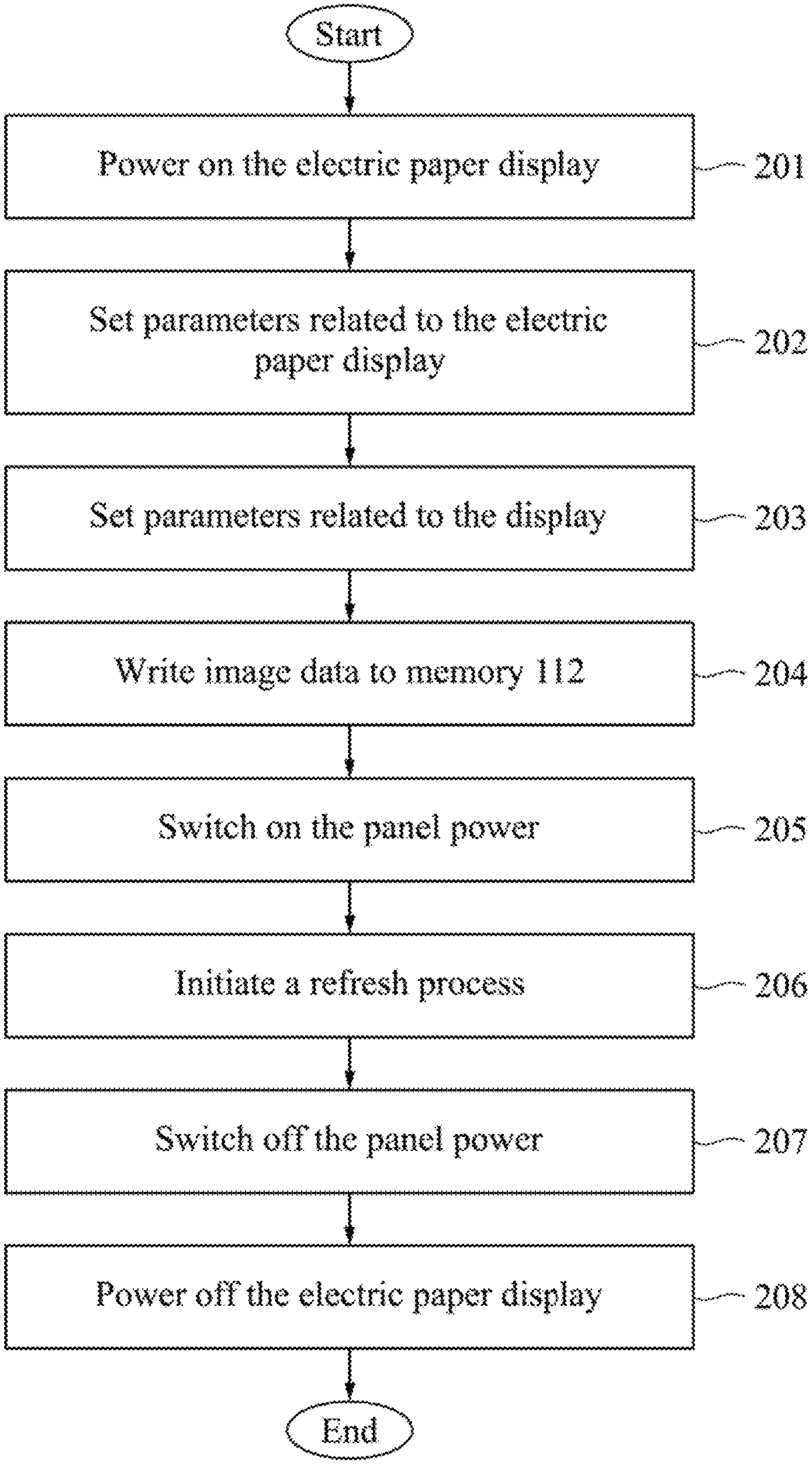
FIG. 2 is a flowchart illustrating the controlling method of the electric paper device according to one embodiment.

In a use-case scenario of one embodiment, the microprocessor 130 continuously receives image data from the external device 140. The image data belongs to a portion of a frame (e.g. a lossless image). For instance, the image data includes grayscale values of multiple pixels, and the frame will be displayed through the electric paper display 110. It has to first understand the operation procedure of the electric paper display 110 in finer steps, and then these steps will be embedded into the procedure of receiving the image data. Specifically, referring to FIG. 2, which is a flowchart illustrating the controlling method of the electric paper device according to one embodiment. In step 201, the electric paper display 110 is powered on. Notably, at this stage, a panel power (for the electric paper panel 111) is not switched on. As a result, the memory 112 receives power, but the electric paper panel 111 does not. Steps 202 and 203 are collectively referred to as an initialization process of the electric paper display 110. In step 202, parameters related to the electric paper display 110 are set, such as setting the resolution, gate lines, data lines, and other related parameters. In step 203, parameters related to the display are set, for instance, setting the length and width of the frame to be displayed. In step 204, the image data is written to the memory 112. It's noteworthy that at this time, the electric paper panel 111 isn't powered on and no refresh process is initiated, hence the image data isn't displayed. In step 205, the panel power is switched on, thus powering the electric paper panel 111. In step 206, the refresh process is initiated. At this moment, the image data stored in the memory 112 is transmitted to the electric paper panel 111. By applying voltage, the electric paper panel 111 can display the complete frame. In step 207, the panel power is switched off. In step 208, the electric paper display 110 is powered off. In prior art, an entire frame is written to the electric paper display 110 and the refresh process is executed in one go that requires continuous utilization of system resources.

Figure 3:
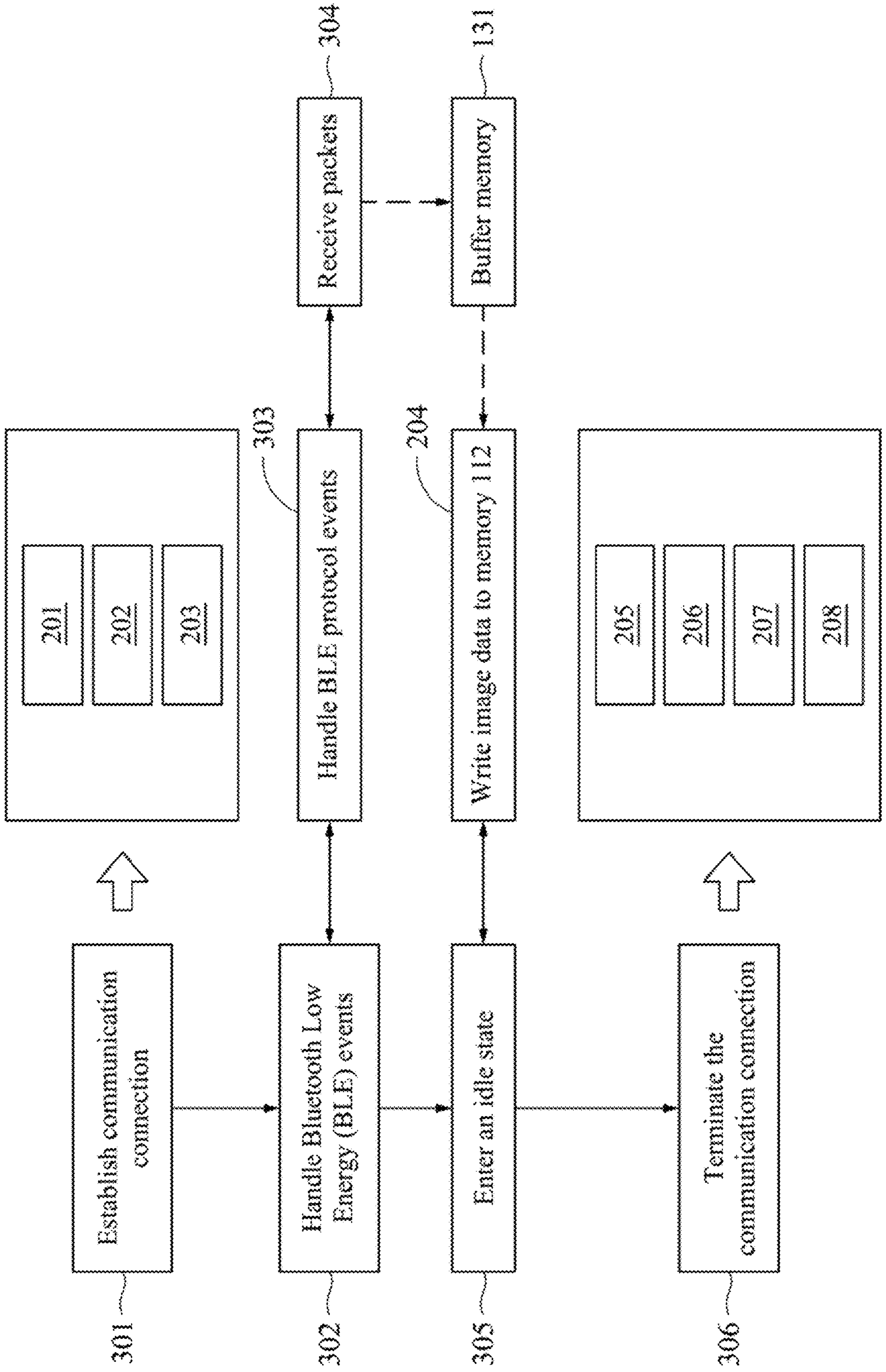
FIG. 3 is a flowchart of incorporating the operation procedure of the electric paper display into the workflow of the communication connection, according to one embodiment.

FIG. 3 illustrates a flowchart of incorporating the operation procedure of the electric paper display into the workflow of the communication connection, according to one embodiment. Referring to FIG. 3, using Bluetooth® as an example, steps 301-306 pertain to Bluetooth communication, while the steps 201-208 are embedded within these steps 301-306. In step 301, a communication connection is established. At this time, the microprocessor 130 executes the steps 201-203. In step 302, Bluetooth Low Energy (BLE) events are handled. In step 303, BLE protocol events are handled. The aforementioned events include connection events, broadcast events, security events, power management events, error events, and so on. After establishing the connection, in step 304, the microprocessor 130 continuously receives packets. These packets contain image data which is stored in the buffer memory 131. In step 305, the microprocessor 130 enters an idle state. During this state, some computational resources are released. Therefore, the microprocessor 130 executes the step 204, wherein it writes the image data to the memory 112 of the electric paper display 110 through the application circuit 120. At this time, the refresh process is not initiated. Once the image data has been written to the memory 112, some space is released from the buffer memory 131. In other words, this process takes advantage of the idle state to write the image data into the memory 112. As a result, there is no need to store an entire image in the buffer memory 131, avoiding the use of a larger buffer memory.

In step 306, the communication connection is terminated. At this time, the microprocessor 130 sequentially executes the steps 205-208. With this process, there is no need to perform the refresh process during the reception of the image data. As the refresh process requires a continuous and uninterrupted time period, executing it during the reception of the image data could potentially disrupt the Bluetooth communication, leading to issues such as packet loss. Furthermore, while both steps 201 and 205 relate to power, the panel power is only switched on after the communication connection is terminated that contributes to power conservation.

Figure 4:
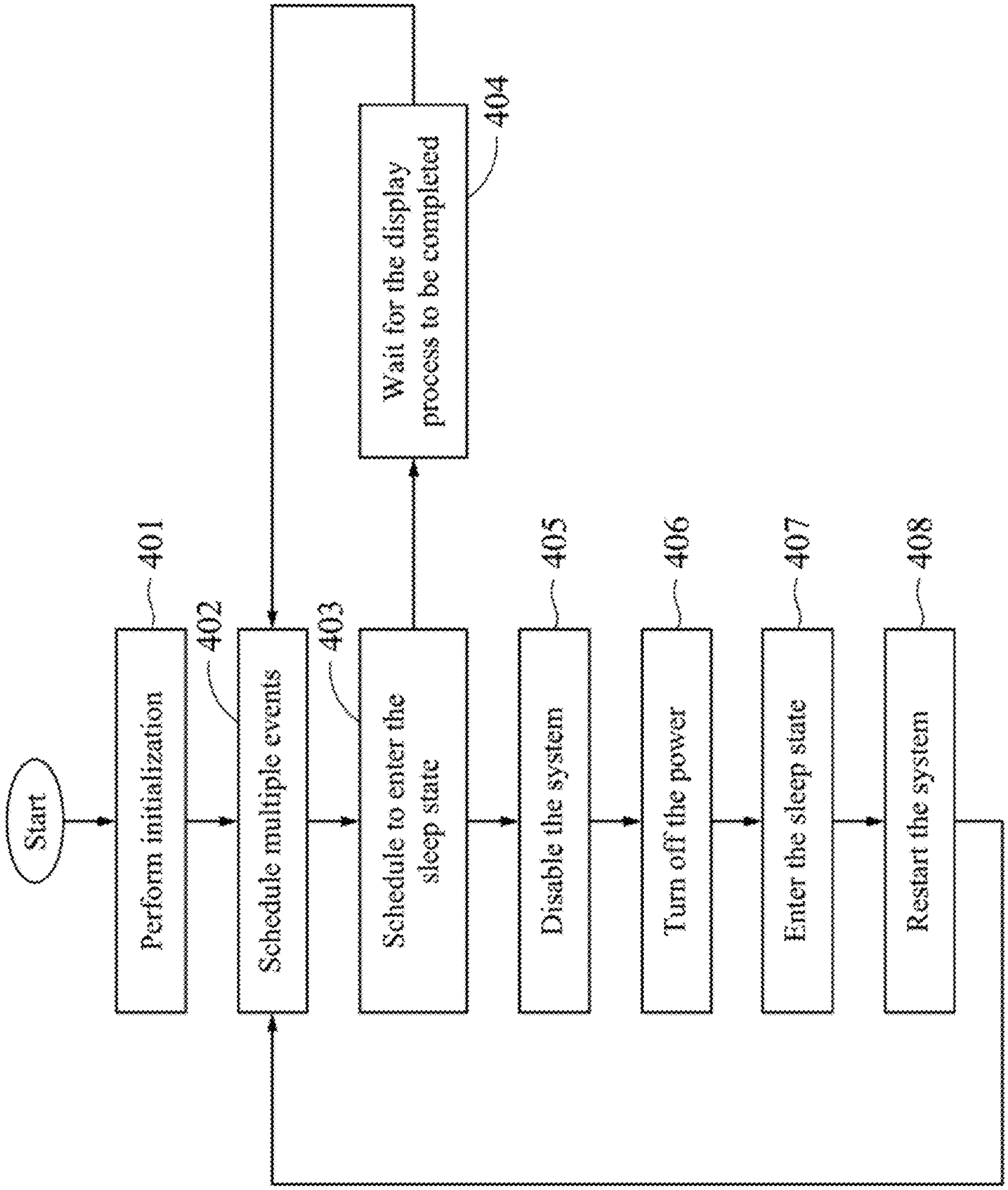
FIG. 4 is a flowchart for entering the sleep state according to an embodiment.

In the known technology, when the microprocessor 130 enters the sleep state, the power consumption is limited to a very low level, which causes the electric paper display 110 not to operate normally. In this embodiment, a display process of the electric paper display 110 must be completed before entering the sleep state. FIG. 4 illustrates a flowchart for entering the sleep state according to an embodiment. Referring to FIG. 4, in step 401, the microprocessor 130 perform initialization. In step 402, the microprocessor 130 schedules multiple events. In step 403, when scheduling to enter the sleep state, the microprocessor 130 determines whether the electric paper display 110 has completed a display process. This display process, for example, includes writing the image data from the buffer memory 131 to the memory 112, transmitting data from the memory 112 to the electric paper panel 111, and the refresh process, etc. If the electric paper display 110 has not completed the display process, the microprocessor 130 is forced to exit the step 403 and waits for the display process to be completed in step 404, and then returns to step 402. If the electric paper display 110 has already completed the display process, then in step 405, the microprocessor 130 disables the system, such as releasing system resources. In step 406, the microprocessor 130 turns off the power. In step 407, the microprocessor 130 enters the sleep state. In step 408, the microprocessor 130 restarts the system. Based on the process of FIG. 4, it can be ensured that the sleep state is not entered prematurely before the display process is complete.

In the aforementioned electric paper device and its controlling method, the process for the electric paper device is broken down into more detailed steps, and these steps are embedded into the original communication process. When using a high-speed communication connection (such as Bluetooth 5.0) to receive lossless images, the communication chip (i.e., microprocessor 130) requires a significant amount of resources. The mentioned method ensures that the original transmission functionality remains unaffected while achieving image display.

From another aspect, embodiments of the present disclosure provide a non-transitory computer readable storage medium such as a random access memory, a read-only memory, a flash memory, floppy disks, hard disks, CD-ROMs, pen drives, tapes, databases accessible via the Internet. The non-transitory computer readable storage medium stores instructions that are executed by a computer to perform the controlling method.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An electric paper device, comprising:

an electric paper display;

an application circuit, electrically connected to the electric paper display; and a microprocessor having a buffer memory and being electrically connected to the application circuit, wherein the microprocessor is configured to establish a communication connection with an external device for continuously receive image data and store the image data into the buffer memory, wherein the image data belongs to a portion of a frame, wherein when the communication connection enters an idle state, the microprocessor is configured to write the image data into the electric paper display through the application circuit without initiating a refresh process of the electric paper display;

wherein before the microprocessor enters a sleep state, the microprocessor is configured to determine if the electric paper display completes a display process, if the electric paper display has not yet completed the display process, the microprocessor cannot enter the sleep state, and the microprocessor enters the sleep state only after the display process is completed.

2. The electric paper device of claim 1, wherein when the communication connection is established, the microprocessor is configured to power on the electric paper display and perform an initialization process corresponding to the electric paper display.

3. The electric paper device of claim 2, wherein when the communication connection is terminated, the microprocessor is configured to sequentially perform a plurality of steps:

switching on a panel power of the electric paper display;

controlling the electric paper display to perform the refresh process;

switching off the panel power of the electric paper display; and powering off the electric paper display.

4. The electric paper device of claim 1, wherein the communication connection complies with standard of Bluetooth®.

5. A controlling method for an electric paper device, the electric paper device comprises an electric paper display, an application circuit, and a microprocessor, the controlling method comprising:

establishing, by the microprocessor, a communication connection with an external device for continuously receive image data, wherein the image data belongs to a portion of a frame;

storing the image data into a buffer memory of the microprocessor;

when the communication connection enters an idle state, writing, by the microprocessor, the image data into the electric paper display through the application circuit without initiating a refresh process of the electric paper display;

before the microprocessor enters a sleep state, determining if the electric paper display completes a display process; and if the electric paper display has not yet completed the display process, the microprocessor cannot enter the sleep state, and the microprocessor enters the sleep state only after the display process is completed.

6. The controlling method of claim 5, further comprising:
when the communication connection is established, powering on the electric paper display and performing an initialization process corresponding to the electric paper display.

7. The controlling method of claim 6, further comprising:
when the communication connection is terminated, sequentially performing a plurality of steps:
switching on a panel power of the electric paper display;
controlling the electric paper display to perform the refresh process;
switching off the panel power of the electric paper display; and
powering off the electric paper display.

8. The controlling method of claim 5, wherein the communication connection complies with standard of Bluetooth®.

9. A non-transitory computer readable storage medium storing a plurality of instructions which are configured to perform a plurality of steps:
establishing, by a microprocessor, a communication connection with an external device for continuously receive image data;
storing the image data into a buffer memory of the microprocessor, wherein the image data belongs to a portion of a frame;
when the communication connection enters an idle state, writing, by the microprocessor, the image data into an electric paper display through an application circuit without initiating a refresh process of the electric paper display;
before the microprocessor enters a sleep state, determining if the electric paper display completes a display process; and
if the electric paper display has not yet completed the display process, the microprocessor cannot enter the sleep state, and the microprocessor enters the sleep state only after the display process is completed.

10. The non-transitory computer readable storage medium of claim 9, wherein the plurality of steps further comprise:
when the communication connection is established, powering on the electric paper display and performing an initialization process corresponding to the electric paper display.

11. The non-transitory computer readable storage medium of claim 10, wherein the plurality of steps further comprise:
when the communication connection is terminated, sequentially performing:
switching on a panel power of the electric paper display;
controlling the electric paper display to perform the refresh process;
switching off the panel power of the electric paper display; and
powering off the electric paper display.

12. The non-transitory computer readable storage medium of claim 9, wherein the communication connection complies with standard of Bluetooth®.

* * * * *